(12) United States Patent
Wittmer et al.

(10) Patent No.: US 11,188,059 B2
(45) Date of Patent: Nov. 30, 2021

(54) METHOD FOR MONITORING A PLANT OF THE AUTOMATION TECHNOLOGY

(71) Applicant: Endress+Hauser Conducta GmbH+Co. KG, Gerlingen (DE)

(72) Inventors: Detlev Wittmer, Maulbronn (DE); Martine Lefebvre, Blotzheim (FR); Oliver Beil, Binzen (DE); Thomas Moore, Jena-Drackendorf (DE); Benedikt Spielmann, Basel (CH)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 38 days.

(21) Appl. No.: 16/574,214

(22) Filed: Sep. 18, 2019

(65) Prior Publication Data

US 2020/0096974 A1 Mar. 26, 2020

(30) Foreign Application Priority Data

Sep. 24, 2018 (DE) ..................... 10 2018 123 436.8

(51) Int. Cl.
 *G05B 19/418* (2006.01)
 *H04Q 9/02* (2006.01)
 *H04L 29/08* (2006.01)

(52) U.S. Cl.
CPC .......... *G05B 19/4184* (2013.01); *H04L 67/12* (2013.01); *H04Q 9/02* (2013.01); *H04Q 2209/30* (2013.01)

(58) Field of Classification Search
CPC .. G05B 19/4184; H04Q 9/02; H04Q 2209/30; H04L 67/12
See application file for complete search history.

(56) References Cited

U.S. PATENT DOCUMENTS 5,625,574 A * 4/1997 Griffiths ............. G05B 23/0229
702/183
2010/0082125 A1 4/2010 Pingel et al.

FOREIGN PATENT DOCUMENTS

DE 102009045386 A1 4/2011

* cited by examiner

*Primary Examiner* — Manuel A Rivera Vargas
(74) *Attorney, Agent, or Firm* — Kelly J. Smith; Endress+Hauser (USA) Holding Inc.

(57) ABSTRACT

The present disclosure comprises a method for managing a plant of the automation technology, including a step of acquiring and storing all data transmitted via a communication network, consisting of process values, control variables and status data, and operating telegrams by a field detection unit, and providing the data and the operating telegrams with time stamps. The method also includes steps of temporally assigning the operating telegrams to the data, and analyzing the assignment and creating an intervention system. The intervention system contains plant states and interventions, wherein a plant state is created on the basis of transmitted data from a sensor unit and from an actuator unit, and wherein an intervention consists of at least one operating telegram following the transmitted data from the sensor unit and from the actuator unit.

11 Claims, 1 Drawing Sheet

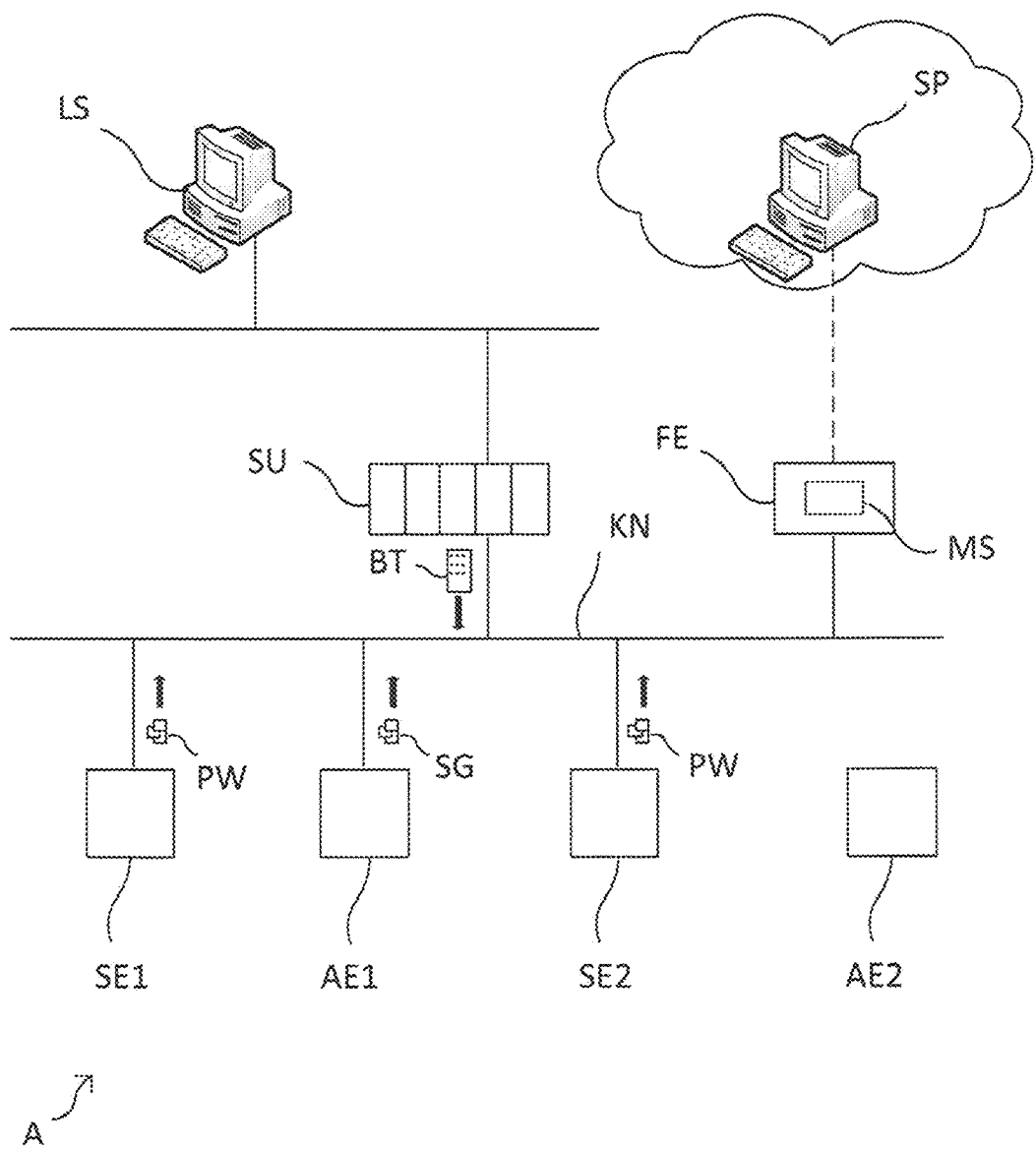

METHOD FOR MONITORING A PLANT OF THE AUTOMATION TECHNOLOGY

CROSS-REFERENCE TO RELATED APPLICATION

The present application is related to and claims the priority benefit of German Patent Application No. 10 2018 123 436.8, filed on Sep. 24, 2018, the entire contents of which are incorporated herein by reference.

TECHNICAL FIELD

The present disclosure relates to a method for monitoring a plant of the automation technology, wherein at least one sensor unit and at least one actuator unit and one field detection unit are used in the plant, wherein the sensor unit and the actuator unit are in communication with a higher-level unit via a communication network, wherein the sensor unit transmits process values and status data to the higher-level unit, wherein the actuator unit transmits control variables and status data to the higher-level unit, and wherein the higher-level unit transmits operating telegrams to the sensor unit and to the actuator unit.

BACKGROUND

Field devices that are used in industrial plants are already known from the prior art. Field devices are often used in process automation as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These measuring devices are used, for example, for pressure and temperature measurement, conductivity measurement, flow measurement, pH measurement, fill level measurement, etc., and detect the corresponding process variables of pressure, temperature, conductivity, pH value, fill level, flow, etc. Actuators are used for influencing process variables. These actuators are, for example, pumps or valves that can influence the flow of a fluid in a pipe or the fill level in a tank. In addition to the aforementioned measuring devices and actuators, field devices are also understood to include remote I/O's, radio adapters, or, generally, devices that are arranged at the field level.

A plurality of such field devices is produced and marketed by the Endress+Hauser group.

In modern industrial plants, field devices are usually connected to higher-level units via communication networks, such as fieldbuses (Profibus®, Foundation® Fieldbus, HART®, etc.). Higher-level units are control units, such as an SPS (storage programmable controller) or a PLC (programmable logic controller). The higher-level units are used for, among other things, process control, as well as for commissioning of the field devices. The measured values detected by the field devices, such as by sensors, are transmitted via the respective bus system to a (or possibly several) higher-level unit(s) that further process the measured values, as appropriate, and relay them to the control station of the plant. The control station serves for process visualization, process monitoring, and process control via the higher-level units. In addition, a data transfer is also required from the higher-level unit via the bus system to the field devices, such as for configuration and parameterization of field devices as well as for control of actuators.

The management of a process engineering process in such a plant is carried out on the basis of deterministic process models in conjunction with control algorithms. The process models are generally based on physical and chemical measured variables taken by the field devices. The control algorithms comprise, for example, PID control models and/or state control models. The process models are modeled in a complex manner on the basis of a preceding system analysis. An essential component of the quality of the process management is the experience of the plant operator.

Such a system analysis is difficult to carry out. Furthermore, any change to the plant system leads to a new necessary system analysis. Unknown disturbance variables and tolerances as well as changes to system components due to aging cannot be taken into account. The training, availability and daily condition of the plant operator influence the quality and the yield of the process engineering process.

SUMMARY

On the basis of this problem, the present disclosure is based on the object of reducing the complexity of the evaluation of the plant system.

The object is achieved by a method for monitoring a plant of the automation technology, wherein at least one sensor unit and at least one actuator unit and one field detection unit are used in the plant, wherein the sensor unit and the actuator unit are in communication with a higher-level unit via a communication network, wherein the sensor unit transmits process values and status data to the higher-level unit, wherein the actuator unit transmits control variables and status data to the higher-level unit, and wherein the higher-level unit transmits operating telegrams to the sensor unit and to the actuator unit, wherein the method comprises the following method steps: acquiring and storing all data transmitted via the communication network, consisting of process values, control variables and status data, and operating telegrams by the field detection unit, and providing the data and the operating telegrams with time stamps; temporally assigning the operating telegrams to the data; and analyzing the assignment and creating an intervention system, wherein the intervention system contains plant states and interventions, wherein a plant state is created on the basis of transmitted data from the sensor unit and the actuator unit, and wherein an intervention consists of at least one operating telegram following the transmitted data from the sensor unit and the actuator unit.

The advantage of the method according to the present disclosure is that interventions are created for different plant states in an automated manner. Such an intervention consists of an operating telegram which is created and transmitted by the higher-level unit. For this purpose, the specific plant states are learned during the operation of the plant. It is also learned which type of operating telegrams are transmitted to which actuator unit or to which sensor unit when a specific plant state occurs. Such a plant state can moreover also be recognized in advance.

An operating telegram to a sensor unit comprises, for example, a changed parameterization for the sensor unit. An operating telegram to an actuator unit comprises, for example, an actuating command for the actuator unit.

The method can be used in any type of plant and is not limited to specific embodiments and uses of a plant since the method operates independently of the deterministically created process model.

The generic term for a sensor unit or an actuator unit is "field device." Examples of such field devices, such as those produced and sold by the applicant, have already been mentioned in the introductory part of the description.

Examples of a field detection unit are, for example, a gateway or an edge device.

A preferred embodiment of the method according to the present disclosure provides that the intervention system is continuously updated by currently acquired data and operating telegrams. Changes can thus be adopted directly. Thus, for example, new types of interventions, which are, for example, more efficient than the previous ones, can always be learned.

An advantageous development of the method according to the present disclosure provides that, on the basis of the intervention system, an intervention consisting of at least one telegram to be transmitted from the higher-level unit to the sensor unit or the actuator unit is calculated and proposed for the current plant state. As a result, the plant in the "learned" state can be run without the plant operator in an automated manner and independently of the daily condition.

A first variant of the method according to the present disclosure provides that the proposed intervention is compared with the actually performed intervention and wherein a degree of correspondence is calculated. In this case, the intervention is not carried out immediately after the intervention has been proposed. Rather, the proposed intervention is stored and compared with the actually performed intervention which is carried out, for example, by the plant operator. The degree of correspondence therefore denotes a measure of how well the method has learned the requirements of the plant.

A second variant of the method according to the present disclosure provides that a user performs an evaluation of the proposed intervention by allocating a degree of correspondence to the proposed intervention.

A preferred embodiment of the method according to the present disclosure provides that the proposed intervention is carried out automatically if, in at least a predetermined number of proposed interventions, the degree of correspondence is calculated or evaluated to be greater than or equal to a predetermined value. The predetermined degree is selected in such a way that the proposed interventions correspond to those interventions which the plant operator would choose, so that no or hardly any losses of performance can be determined by the automatic intervention control. However, the "quality" of the proposed interventions can at best reach the quality level of the plant operator.

An advantageous development of the method according to the present disclosure provides that a process control unit is used to create the intervention system and to calculate an intervention, wherein the process control unit contains information about end and intermediate results of the process which is being run in the plant, such as information about the yield of the process and/or about the temporal behavior of the process.

In accordance with an advantageous embodiment of the method according to the present disclosure, it is provided that the process control unit is used to evaluate performed interventions, wherein the evaluations of the performed interventions are included in the calculation of an intervention for the current plant state. In this way, the immediate effect of an intervention can be estimated and evaluated. For example, not all the interventions that the plant has learned from the plant operator are necessarily optimal or appropriate. The interventions strongly depend on the degree of experience of the plant operator. This embodiment makes it possible for the proposed interventions to be optimized and to be able to exceed the quality level of the interventions proposed by the plant operator.

In a preferred development of the method according to the present disclosure, it is provided that at least one further actuator element is used in the plant which has no connection to the communication network, wherein the further actuator element is used to create and update the intervention system, and wherein the control variables of the actuator element or changes to the control variables of the actuator element are calculated using the process variables collected by the sensor unit. Such an actuator element, for example a pump or a valve, can be controlled, for example, by hand or by means of an operating unit which can be connected directly to the actuator unit, not communicating via the communication network. Due to changes in the process variables measured by the sensor units, the changes to the control variables can be reliably calculated.

An advantageous embodiment of the method according to the present disclosure provides that the process control unit is used to calculate the control variables of the further actuator element. The creation of the intervention system and the proposal of the interventions can only be carried out reliably if the data from all plant components, consisting of sensor units and actuator units, are taken into account. Since the control variables of the actuator units can be calculated from the collected process variables, plants which do not support a connection to a communication network are also suitable for the method according to the present disclosure.

According to a preferred embodiment of the method according to the present disclosure, it is provided that the steps of analyzing the assignment of the operating telegrams to the data, of creating the intervention system, of calculating an intervention for the current plant state, of calculating the degree of correspondence and/or of evaluating performed interventions are carried out by the fieldbus access unit using an AI algorithm. For example, an algorithm using neural networks is used as the AI algorithm.

Alternatively, the field detection unit is connected to a cloud-capable service platform via a further communication network, for example the Internet. The data collected by the field detection unit is transmitted by the latter to the cloud-capable service platform. The cloud-capable service platform serves to execute the AI algorithm and serves to then analyze the assignment of the operating telegrams to the data, create the intervention system, calculate an intervention for the current plant state, calculate the degree of correspondence and/or evaluate performed interventions. A cloud-capable service platform is understood to be a database which is compatible with cloud computing technology and on which applications can be run. In this case, cloud computing is understood to mean storing information and accessing the stored information via the Internet.

BRIEF DESCRIPTION OF THE DRAWINGS

The present disclosure is explained in greater detail with reference to the following FIGURE. Illustrated is:

FIG. 1 shows an exemplary embodiment of the method according to the present disclosure.

DETAILED DESCRIPTION

FIG. 1 schematically depicts a plant A of the automation technology. In the plant, a process engineering process is run in which at least one product of predetermined quality and quantity is determined from at least one starting material of predetermined quality and quantity. For example, the plant has a tank and a pipeline which discharges from the tank. In order to measure the fill level of the tank as a process variable, a sensor unit SE1, for example a sensor unit SE1 operating according to the radar principle, is attached to the tank. In order to measure the flow rate in the pipeline, a sensor unit SE2 is used which determines the flow rate of the process variable of the medium flowing through the pipeline according to the Coriolis principle. Furthermore, an actuator unit AE1 is installed on the tank, which is, for example, a pump and which conveys the medium into the tank at an adjustable rate as a control variable.

The sensor units SE1, SE2 and the actuator unit AE1 are interconnected by means of a communication network KN and are in communication with each other. The communication network KN may be an Ethernet network. Alternatively, the first communication network KN1 is a fieldbus according to one of the known fieldbus standards, for example Profibus, Foundation Fieldbus or HART.

The first communication network KN includes a higher-level unit SU, for example a storage programmable controller, which transmits commands to the sensor units SE1, SE2, whereupon the sensor units SE1, SE2 transmit process values PW, diagnostic data and status information to the higher-level unit SU. These process values PW, diagnostic data and status information are forwarded by the higher-level unit SU to a workstation PC in the control center LS of the plant A. This workstation PC serves inter alia for process visualization, process monitoring and for engineering, such as for operating and monitoring the sensor units SE1, SE2.

Furthermore, the higher-level unit is designed to request current values of the control variable SG of the actuator unit and to transmit operating telegrams BT to the actuator unit AE, wherein an operating telegram BT contains a command for changing the value of the control variable SG to a value defined in the operating telegram.

Furthermore, the first communication network KN1 includes a field detection unit FE, for example in the form of a gateway or an edge device, which receives and stores the process values PW, control variables SG, diagnostic data and status information transmitted from the sensor units SE1, SE2 and from the actuator unit AE1 to the higher-level unit SPS as well as the operating telegrams BT sent out by the higher-level unit SU. In a particular embodiment, the field detection unit provides these data PW, SG to a cloud-stored service platform SP via the Internet. The service platform SP is designed to execute applications. Such an application is, for example, a plant asset management system which serves to manage the assets, i.e., the inventory, of the plant A.

A further actuator unit AE2 is used in the plant. This further actuator unit is, for example, a valve which determines the rate of the medium emerging from the tank and flowing through the pipeline. The further actuator unit AE2 is not connected to the communication network KN of the plant A and is operated on site by the plant operator.

In the following, a use of the method according to the present disclosure is described:

The management of the plant A is normally carried out by the plant operator. In the event that the plant assumes undesired plant states, the control variables of the actuator units AE1, AE2 are, for example, changed as an intervention. However, the quality of this process management (the detection of the undesired plant state and making the corresponding appropriate intervention) is sometimes highly dependent on the experience and/or the daily condition of the plant operator.

In order to automate this process management, an AI algorithm is implemented on the field detection unit FE or on the service platform SP. This AI algorithm arranges the acquired data PW, SG from the sensor units SE1, SE2 and from the actuator unit AE1 in time order. Based on the process values acquired by the sensor unit SE2 in the form of a flow rate, the value of the control variable SG of the further actuator unit AE2 set at the time of detection of the process value can be calculated. In addition, the operating telegrams transmitted by the higher-level unit SU are temporally assigned to the data PW, SG.

In the next method step, these temporal assignments are analyzed and an intervention system MS is created by means of the AI algorithm. In this system, the plant states identified by the analysis as well as the interventions taken by the plant operator in response to these identified plant states are listed in the form of operating telegrams BT. In particular, it is specified in the intervention system which intervention was taken on the basis of which plant state. In addition, the diagnostic and status data from the sensor units SE1, SE2 and from the actuator unit AE1 are included in order to refine the determination of the plant state. This intervention system MS is continuously refined by constantly receiving the data PW, SG and the operating telegrams BT.

In addition, the AI algorithm detects newly occurring plant states on the basis of the currently acquired data PS, SG and, if applicable, the diagnostic and status data on the basis of the plant states identified in the intervention system MS. The AI algorithm then proposes an appropriate intervention. This intervention is subsequently compared with the actually performed intervention and a degree of correspondence is created. Only if this degree of correspondence exceeds a predetermined degree several times (the exact required number can be specified) has the AI algorithm been trained in such a way that reliably appropriate interventions in the sense of the plant operator are proposed. As a consequence, the AI algorithm can initiate the appropriate intervention itself without the need for the plant operator to get involved.

In order to further increase the quality of the proposed interventions and possibly even to elevate it above the quality of the interventions specified by the plant operator, a process control unit is provided to the AI algorithm, which process control unit contains information about end and intermediate results of the process which is being run in the plant A, such as information about the yield of the process and/or about the temporal behavior of the process. By means of the control unit, the immediate effects of an intervention can be observed and evaluated in order to propose future interventions which take into account findings from this evaluation.

Finally, an example of a process which is run in the plant A is described:

The plant A is a water treatment plant. The sensor unit SE1 is an oxygen sensor. The sensor unit SE2 is a turbidity sensor. Over time, components of the sensor units SE1, SE2 become soiled: For example, the membrane of the sensor unit SE1 is continuously soiled.

Due to this soiling, the process values measured by the sensor units SE1, SE2 shift by a certain offset. The plant operator recognizes this gradually changed offset and adjusts the parameterization of the sensor units SE1, SE2 in such a way that the respective offset is compensated.

The "soiled" plant state and the "change in parameterization to compensate for the offset resulting from soiling" intervention are recognized and adapted by the AI algorithm. In the event of a re-occurring soiling of the sensor units, or in the event of an increasing soiling, or in the case of an installation of a new sensor unit which becomes soiled, the AI algorithm recognizes this plant state automatically and automatically proposes the appropriate intervention or automatically executes it.

The method can be used in any kind of plant A and is not limited to specific embodiments and uses of a plant A since the method operates independently of deterministically created process models.

The invention claimed is:

1. A method for monitoring a plant of the employing process automation technology, wherein at least one sensor unit and at least one actuator unit and one field detection unit are used in the plant, wherein the sensor unit and the actuator unit are in communication with a higher-level unit via a communication network, wherein the sensor unit transfers process values and status data to the higher-level unit, wherein the actuator unit transfers control variables and status data to the higher-level unit, and wherein the higher-level unit transmits operating telegrams to the sensor unit and to the actuator unit, wherein the method comprises the following method steps:
   acquiring and storing all data transmitted via the communication network, consisting of process values, control variables and status data, and operating telegrams by the field detection unit, and providing the data transmitted via the communication network and the operating telegrams with time stamps;
   temporally assigning the operating telegrams to the data transmitted via the communication network; and
   analyzing the assignment and creating an intervention system, wherein the intervention system contains plant states and interventions, wherein a plant state is created on the basis of transmitted data from the sensor unit and from the actuator unit, and wherein an intervention consists of at least one operating telegram following the transmitted data from the sensor unit and from the actuator unit.

2. The method of claim 1, wherein the intervention system is continuously updated by currently acquired data and operating telegrams.

3. The method of claim 1, wherein on the basis of the intervention system, an intervention consisting of at least one telegram to be transmitted from the higher-level unit to the sensor unit or the actuator unit is calculated and proposed for the current plant state.

4. The method of claim 3, wherein the proposed intervention is compared to a performed intervention and wherein a degree of correspondence is calculated.

5. The method of claim 3, wherein a user makes an evaluation of the proposed intervention by allocating a degree of correspondence to the proposed intervention.

6. The method of claim 5, wherein the proposed intervention is performed automatically if, in at least a predetermined number of proposed interventions, the degree of correspondence is calculated or evaluated to be greater than or equal to a predetermined value.

7. The method of claim 1, wherein a process control unit is used to create the intervention system and to calculate an intervention, wherein the process control unit contains information about end and intermediate results of the process which is being run in the plant.

8. The method of claim 7, wherein the process control unit is used to evaluate performed interventions, wherein the evaluations of the performed interventions are included in calculating an intervention for the current plant state.

9. The method of claim 7, wherein at least one further actuator unit is used in the plant and has no connection to the communication network, wherein the further actuator unit is used to create and update the intervention system, and wherein the control variables of the actuator unit or changes to the control variables of the actuator unit are calculated using the process variables collected by the sensor unit.

10. The method of claim according to claim 9, wherein the process control unit is used to calculate the control variables of the further actuator unit.

11. The method of claim 4, wherein the steps of analyzing the assignment of the operating telegrams to the data transmitted via the communication network, of creating the intervention system, of calculating an intervention for the current plant state, of calculating the degree of correspondence and/or of evaluating performed interventions are carried out by the field detection unit using an artificial intelligence algorithm.

* * * * *